United States Patent
Fillbrandt et al.

(10) Patent No.: US 11,823,550 B2
(45) Date of Patent: Nov. 21, 2023

(54) MONITORING DEVICE AND METHOD FOR MONITORING A MAN-OVERBOARD IN A SHIP SECTION

(71) Applicant: Robert Bosch GmbH, Stuttgart (DE)

(72) Inventors: Holger Fillbrandt, Bad Salzdetfurth (DE); Claudio Scaravati, Milan (IT); Gabriele Mangiafico, Milan (IT); Hans-Dieter Bothe, Seelze (DE); Paolo Mario France Terzon, Macherio (IT); Sarah Möhring, Hannover (DE); Stefano Riboli, Lacchiarella (IT)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 17/427,390

(22) PCT Filed: Jan. 13, 2020

(86) PCT No.: PCT/EP2020/050695
§ 371 (c)(1),
(2) Date: Jul. 30, 2021

(87) PCT Pub. No.: WO2020/160875
PCT Pub. Date: Aug. 13, 2020

(65) Prior Publication Data
US 2022/0101713 A1  Mar. 31, 2022

(30) Foreign Application Priority Data

Feb. 6, 2019 (DE) .................... 10 2019 201 493.3

(51) Int. Cl.
*G08B 21/08* (2006.01)
*G06V 20/58* (2022.01)
(Continued)

(52) U.S. Cl.
CPC ........... *G08B 21/08* (2013.01); *G06V 10/143* (2022.01); *G06V 10/147* (2022.01); *G06V 20/58* (2022.01)

(58) Field of Classification Search
CPC ...... G08B 21/08; G06V 20/58; G06V 10/143; G06V 10/147
(Continued)

(56) References Cited

U.S. PATENT DOCUMENTS 8,810,436 B2 *  8/2014  Zagami .................. G01S 17/04
                                                   441/89
2017/0154223 A1 *  6/2017  Maali .................... G06V 10/147
(Continued)

FOREIGN PATENT DOCUMENTS

WO    2018140549 A1    8/2018

OTHER PUBLICATIONS

Translation of International Search Report for Application No. PCT/EP2020/050695 dated Mar. 27, 2020 (3 pages).

*Primary Examiner* — Kerri L McNally
(74) *Attorney, Agent, or Firm* — Michael Best & Friedrich LLP (57) ABSTRACT

The invention relates to a monitoring device 1 for monitoring a man-overboard situation in a ship section 4, wherein the ship section 4 is monitored by video technology using at least one camera 5a,5b and the camera 5a,5b is designed to provide surveillance in the form of video data. The monitoring device comprises an evaluation device 7, said evaluation device 7 having an interface for receiving the video data, wherein the evaluation device 7 is designed to detect a moving object in the ship section 4 on the basis of the video data and to determine a kinematic variable of the moving object. The evaluation device 7 is designed to determine a starting point in three dimensions on the basis (Continued)

of the video data and the kinematic variable of the moving object and to evaluate the moving object as a man-overboard event on the basis of the starting point.

15 Claims, 2 Drawing Sheets

(51) Int. Cl.
 *G06V 10/143* (2022.01)
 *G06V 10/147* (2022.01)
(58) Field of Classification Search
 USPC .......................................................... 340/573.6
 See application file for complete search history.

(56) References Cited

U.S. PATENT DOCUMENTS

2018/0259339 A1\* 9/2018 Johnson ................ G05D 1/0692
2020/0012283 A1\* 1/2020 Nguyen ................ G05D 1/0206

\* cited by examiner

MONITORING DEVICE AND METHOD FOR MONITORING A MAN-OVERBOARD IN A SHIP SECTION

BACKGROUND

A monitoring device for monitoring man-overboard events in a ship section is proposed. The monitoring device comprises at least one camera for monitoring the ship section using video technology. An evaluation device is designed to detect a moving object and to determine a kinematic variable.

On ships, and in particular on passenger ships, it is a known problem that passengers can fall overboard unnoticed during the voyage. Such events are referred to as man-overboard events. The chances of survival after such an event decrease with the time that elapses before the event is discovered. Shipping companies are interested in having the ability to detect such events as quickly as possible.

In particular, there are government regulations and/or insurance requirements that require increased monitoring and improved detection of such events. On cargo ships such monitoring is carried out by means of armbands or transponders.

When using video-based monitoring, a potential problem is that moving objects, such as spray, birds or objects falling off the vessel, can be incorrectly detected as a man-overboard event. Therefore, it is necessary to reduce such misdetections to improve the false alarm rate. For example, the ISO standard ISO/PAS 21195 "Ships and marine technology" requires that monitoring systems for man-overboard monitoring have a detection rate of better than 95 percent and, on average, trigger less than one false alarm per day.

SUMMARY

A monitoring system is proposed. A method is proposed. Preferred and/or advantageous embodiments of the invention are obtained from the subclaims, the description and the attached figures.

A monitoring device for a ship, in particular a passenger ship, is proposed. The monitoring device is designed to detect persons falling overboard as a man-overboard event. The man-overboard monitoring by means of the monitoring device, for example, makes a distinction between whether a person or some other object has fallen overboard. For example, the ship section may be part of a ship's living area, preferably a section where a person can fall overboard and in particular, an area with a railing. It is also preferably provided that the ship section forms a monitoring section. The ship section also comprises, in particular, a part of the sea and/or the sea surface. The monitoring device can be designed to monitor a plurality of ship sections. For example, the monitoring device is designed to issue an alarm when a man-overboard event is detected.

The monitoring device comprises at least one camera. The camera is preferably designed as a color camera. In particular, the camera or at least one camera may be designed as an infrared camera. It is particularly preferred that each ship section be monitored using a pair of infrared and color cameras. In particular, the monitoring device comprises a plurality of cameras, the cameras being able to monitor more than one ship section, wherein the ship sections may or may not be overlapping. It is particularly preferred for the camera to be mounted at the side, for example on a ship's side panel. The camera monitors the ship section using video and/or image technology. For example, an area of the ship and an external area of the ship facing the sea and/or the sea surface are monitored using video technology. The video-technology monitoring is provided by the camera and/or cameras as video data.

The monitoring device comprises an evaluation device. The evaluation device can be designed as a software module and/or a hardware module. The video data is provided to the evaluation device. The evaluation device comprises an interface for a data communication connection to the camera or a plurality of cameras. In particular, the evaluation device is designed for image evaluation.

The evaluation device is designed to detect a moving object in the ship section. For this purpose, the evaluation device compares, for example, chronologically sequential and/or separated images of the video data. In particular, the evaluation device is designed to continue tracking and/or evaluating the detected moving object. The evaluation device is designed to determine a kinematic variable for (each of) the detected moving object(s). For example, the kinematic variable is a velocity of the object as a magnitude or as a vector quantity. Alternatively, the kinematic variable can be a path, an impulse, or an acceleration of the moving object. In particular, the evaluation device is designed to determine a plurality of kinematic variables for a moving object. Preferably, the evaluation device determines the kinematic variable of the moving object until the moving object comes to a standstill or disappears.

The evaluation device is designed to determine a starting position of the moving object based on the kinetic variable. The starting position is a position and/or an orientation in three dimensions. The starting position is defined, for example, by a coordinate in three dimensions, in particular at the position for which the evaluation device detects the motion for the first time. For example, the evaluation device can determine the starting position in three dimensions using a kinematic variable to be expected in real conditions, together with imaging parameters. Although the camera does not make stereo recordings, it is possible to make a 3D determination by recourse to imaging parameters of the camera, for example in the form of intrinsic and/or extrinsic calibration parameters, as well as the kinematic variable, for example, by determining a distance to the camera as depth information, based on the kinematic variable and the imaging parameters.

The invention provides that the evaluation device is designed to determine the moving object as a man-overboard event on the basis of a starting position. The starting position is in particular an orientation and/or position in three dimensions. For example, the position is specified in three dimensions relative to the camera. For example, the evaluation device only treats moving objects as man-overboard events if their starting positions lie within one section, in particular within the vessel or the railing. Starting positions outside the ship are treated, for example, as spray or birds, or as not relevant.

The invention is based on the idea of determining moving objects as a relevant event based on a position in a three-dimensional world coordinate system, instead of evaluating movements limited to two dimensions as was previously the case. In the current prior art, although purely video-based approaches are cost-effective in terms of their installation, the image processing algorithms are not yet sufficiently sensitive and robust that false detections are suppressed. Weather conditions and lighting scenarios, in particular, produce increased numbers of false alarms. In addition, the dynamic scenery with a great deal of movement, for example due to wave motion, spray, moving objects on water or on land, persons moving on board, birds and other events, makes the use of video-based approaches more difficult. However, the present invention provides a cost-effective means and a versatile monitoring device enabling a high reliability and robustness of the automatic detection of man-overboard events by means of video cameras. In particular, the monitoring device is characterized by a low probability of false alarms.

In particular, the camera has at least one intrinsic calibration parameter and at least one extrinsic calibration parameter. In particular, the camera has a plurality of intrinsic calibration parameters and a plurality of extrinsic calibration parameters. The intrinsic calibration parameters are in particular calibration parameters that are specified by the camera itself, in particular by its method of manufacture. Intrinsic calibration parameters are, for example, imaging parameters of the camera. Preferably, intrinsic camera parameters are focal length, lens properties and/or lens distortion of the camera. In particular, intrinsic calibration parameters are fixed parameters that do not change, or not significantly, over the lifetime and/or operating time of the camera and/or the monitoring device. For example, intrinsic calibration parameters can be defined once and/or initially during installation of the monitoring device and/or calibration device and/or camera.

Extrinsic calibration parameters are understood in particular to mean camera parameters that depend on the arrangement, orientation and/or mounting of the camera. For example, extrinsic calibration parameters describe the viewing angle of the camera with respect to a horizontal, a sea surface, or a ship plane. In particular, a mounting height of the camera from a floor and/or from the sea surface form an extrinsic calibration variable. Furthermore, the mounting distance of the camera from a ship's wall can form an extrinsic calibration variable. For example, the orientation may include an angle of inclination. In addition, extrinsic calibration parameters can describe, for example, a distance to a fixed point and/or reference point. The extrinsic calibration parameters are, in particular, mounting-dependent calibration and/or camera parameters. The extrinsic calibration parameters are preferably defined by the mounting and/or arrangement of the camera and/or can be changed by displacement, changing the orientation, and/or demounting the camera. In particular, based on knowledge of the intrinsic calibration parameters and the extrinsic calibration parameters, it is possible to determine distances, extensions, orientations and/or positions in the ship section, in particular in three dimensions.

The evaluation device is optionally designed to determine the kinematic variable of the moving object and/or the starting position based on the video data, the extrinsic and/or the intrinsic calibration parameters. For example, the evaluation device can be designed to use the imaging parameters of the camera to compare the kinetic variable with a physical variable in the real world and, based on this, to determine the starting position, distances, resolutions and/or lengths using the video data. For example, the kinetic variable is a velocity or an acceleration, wherein a corresponding value in the real world is known and the evaluation device determines the starting position based on it.

One consideration of the embodiment is to transform the trajectory of a hypothetically falling object from the two-dimensional image plane into a suitable three-dimensional world coordinate system using the camera calibration. Such a transformation is only possible if, in addition to the two-dimensional image coordinates, the position of the object in a third coordinate is known. This can be, for example, the distance of the object from the camera. In order to obtain this distance information for the freely falling object, the vertical acceleration of the object is preferably first determined in pixels per second$^2$. With the known acceleration due to gravity of 9.81 m/s$^2$, the spatial resolution of the object can thus be obtained in pixels per meter, which can be transformed into the required distance from the camera using the focal length of the camera.

In particular, it is provided that the evaluation device is designed to determine an extension of the moving object, in particular an extension in the real world, based on the kinematic variable. For example, the extension is a diameter or a surface dimension. Alternatively, the extension can be formed by a volume dimension. The extension is, in particular, a length, a width or a diameter of the object. Preferably, the extension is the maximum longitudinal extension of an object. The extension of the object is determined in particular on the basis of the video data and the kinematic variable, in particular using knowledge of the focal length, extrinsic and/or intrinsic calibration parameters. Preferably, the evaluation device determines a scale, such as an imaging scale, from the kinetic variable and the video data, wherein the extension of the object is determined on the basis of the scale. In particular, the object in the video data is measured and/or determined based on the scale.

For example, the evaluation device is designed to evaluate the video data and/or the kinematic variable of the object and/or the event belonging to the object, and to examine it for the possibility of a man-overboard event, wherein the verification or rejection as a man-overboard event is based on the extension of the object.

For example, the evaluation device is designed to treat all accelerated movements, in particular accelerated movements directed vertically and/or directed towards the sea, as possible man-overboard events, wherein the rejection and/or verification of whether the event is a real man-overboard event is determined on the basis of the extension and/or the starting position. In this manner, for example, it is possible to eliminate the possibility of a falling object, such as a cigarette, being incorrectly detected as a man-overboard event.

It is particularly preferable that the monitoring device comprises a classification module, the classification module preferably being part of the evaluation device. The classification module is designed to determine an appearance for the moving object. For example, the classification module is designed to segment images of the video data and/or to group segments of a segmented image into classes. The appearance is, for example, a geometric shape, a color pattern, a contrast pattern and/or optical structures. The evaluation device is then specifically designed to evaluate the moving object as a man-overboard event by considering the appearance. For example, objects with incorrect and/or deviating appearance, in particular shape and/or color, are classed as false alarms and/or non-human objects, for example, as birds or water spray. The classification module particularly preferably comprises artificial intelligence, for example a neural network. The classification module with the artificial intelligence is designed to decide on the basis of the appearance of the detected falling object whether it more closely resembles a person or a different, typical false alarm object.

One embodiment of the invention provides that the evaluation device is designed to determine an end point for the moving object based on the kinematic variable and the video data. The end point is, for example, the point of impact of the object in the sea. Alternatively and/or in addition, the end point is the last point for which a movement has been determined and/or can be determined for the object. The end point is preferably determined by the evaluation device as a position in three dimensions. The path and/or trajectory of the moving object runs between the starting position and the end point. The evaluation device is designed to include the end point in the evaluation of the moving object as a man-overboard event. For example, endpoints that are not located on the ocean surface are not considered to be a man-overboard event.

The evaluation device particularly preferably comprises artificial intelligence. For example, the evaluation device comprises a neural network. The evaluation device with the artificial intelligence is designed to learn and/or improve the process of evaluating the moving object as a man-overboard event. For example, the learning involves evaluating and/or using the starting position, the end point, the extension, the appearance and/or combinations of these.

In particular, the kinematic variable determined by the evaluation device is a free-fall acceleration, wherein the evaluation device comprises the free-fall acceleration in reality as the known acceleration due to gravity. The acceleration due to gravity is also referred to as the reference free-fall acceleration. The evaluation device is preferably designed to determine a scale, the starting position, the end point and/or the extension of the moving object by comparing the free-fall acceleration measured in the video data and the known acceleration due to gravity. Based on the focal length, the intrinsic and/or extrinsic calibration parameters, the evaluation device can determine the trajectory, path, starting position and/or end point in three dimensions.

Preferably, the monitoring device comprises a selection module. The selection module is designed as a human-machine interface. The selection module allows a user to enter data, for example in alphanumeric or graphical form. Preferably, the selection module comprises a graphical display, wherein, for example, the video data is displayed on the display and/or a model of the ship section is displayed for selection and/or input. The selection module allows the user to select and/or define a danger zone. The selection can be made graphically, for example, by defining a surface and/or by means of a polygonal chain and/or by means of three-dimensional measurements, e.g., distance from the ship's wall or height above the water surface. In particular, the danger zone is an area of the ship in which people can be present and/or where there is a risk of falling overboard. The evaluation module is specially designed to calculate the possible associated impact zone from the three-dimensional danger zone and the calibration parameters. The impact zone assigned to a danger zone is preferably the section of sea below the danger zone in which a person falling overboard from the danger zone would hit the surface of the water. The evaluation module is specifically designed to evaluate the moving object as a man-overboard event based on the danger zone and/or the impact zone. For example, the evaluation device only treats moving objects as man-overboard events if their starting position lies within the danger zone and/or their end point is located in the associated impact zone.

Optionally, the monitoring device comprises a modeling module which is preferably part of the evaluation device. The modeling module comprises a model, in particular a 3D model and/or CAD model, of the ship section and/or the ship. The model may comprise in particular the arrangement, orientation and/or imaging parameters of the camera. For example, the model can be displayed on the selection module display, wherein the user can select and/or define the danger zone, for example, in the model. The evaluation device can be designed to use the model when evaluating whether the moving object is a man-overboard event. For example, the model is used as a plausibility check and/or distances, calibrations and/or variables are verified or calculated by means of the model. The model is used as additional information for calculations and/or checks.

In particular, the evaluation device is designed to determine a trajectory for the moving object and/or to track the moving object. The trajectory is preferably interpreted as the path of the moving object, wherein the trajectory can also include information such as accelerations and velocities. The trajectory of an object falling freely in the gravitational field of the earth describes a parabola. The trajectory can be determined by the evaluation device as a trajectory in two or three dimensions. The evaluation device is designed to use the trajectory when evaluating whether the moving object is a man-overboard event. For example, man-overboard events must have a parabolic trajectory.

It is particularly preferred that the video data comprise monocular images. For example, the camera is designed as a monocular camera, in particular for capturing images without depth information. Alternatively, a stereo camera and/or a binocular camera can form the camera. The camera can be designed in particular to be zoomable.

Specifically, the camera has two camera units. The two camera units each image the same section of the ship. One of the camera units is preferably designed as a camera unit for capturing images in the visible wavelength range of light, while the other camera unit is designed as a camera unit for capturing images in the far-infrared range (FIR) and/or in the NIR range. This embodiment is motivated by a desire to make the monitoring system more robust, which will allow monitoring during the day and at night.

One embodiment of the invention provides that the monitoring device has a calibration device and an input module. The input module may be part of the calibration device. The input module is designed in particular for graphical input. Using the input module, graphical areas can be displayed, drawn and/or selected. In particular, the input module can preferably be used for numerical or alphanumeric input. For example, the input module is designed as a touch screen.

The input module allows a user to enter, select, define, and/or draw a calibration element. In particular, a plurality of calibration elements can be entered by the user. For example, a calibration element is understood to mean an item of information and/or a structure in the image and/or the ship section. In particular, it is provided that the user and/or the calibration device possesses and/or comprises additional information relating to the calibration element. The calibration element is intended in particular to enable conclusions to be drawn about calibration parameters.

Calibration elements are, for example, lines, surfaces, sections, two-dimensional or three-dimensional objects. In particular, a calibration element has an orientation and/or an extension. The extension is, for example, a length, a width, or a depth. For example, the calibration element orientation is a direction in a world coordinate system or a reference coordinate system. In particular, an orientation can also include and/or describe angles and/or orientations with respect to one another. For example, a calibration element can be a perpendicular to a water surface, a ship plane, or the horizon.

Calibration elements can also be angular positions of the ship's body, for example of the railing relative to the ship's surface and/or the ship's floor. For example, the calibration element can be manually defined and/or entered in the form of lines, points and/or polygons. In particular, the orientation and/or extension can be entered by the user in the form of numerical information via the input module. For example, the user assigns lengths, angles, and/or orientation to the calibration element numerically or alpha-numerically. In addition, the input module allows a user to set and/or adjust calibration parameters as known calibration parameters, for example by defining numerical values.

The calibration device comprises an evaluation module. In particular, the evaluation module can be the evaluation module for the input as described above. For example, the evaluation module is formed by a software module or a computer module. For example, the evaluation module can be implemented on the input module and/or form a common module with it. The calibration element and/or the video data are provided to the evaluation module by data communication technology. The orientation and/or extension of the calibration element is also provided to the evaluation module. In particular, known calibration parameters are also provided to the evaluation module. The evaluation module is designed, based on the calibration element, in particular the orientation and/or extension of the calibration element, and preferably on the known calibration parameters, to determine the unknown, extrinsic and/or intrinsic calibration parameters. For example, the extrinsic calibration parameters are determined once when the monitoring device is commissioned, or periodically, for example daily or weekly. In particular, the evaluation module is designed to determine the orientation, viewing direction and/or mounting arrangement of the camera based on the intrinsic calibration parameters, e.g., focal length and lens distortion as well as the orientation and/or extension of the calibration element, by means of the video data and/or monitoring of the ship section using imaging technology. In particular, the calibration element corresponds to an element, a structure and/or a real object in the ship section which is monitored by the camera as video data. For example, the calibration element is a visible line in the real ship section which has a fixed length. This line is imaged by the camera so that the evaluation module can determine the extrinsic calibration parameters based on the image of the line and the known length and/or orientation. The determination of the extrinsic calibration parameters is preferably based on the lens equation and/or the imaging equation of the optics.

This is based on the consideration that when monitoring a section of the ship with cameras for man-overboard monitoring, the cameras must be particularly well calibrated. In particular, it is necessary to know the orientation and/or the imaging parameters of the camera in order to enable good, reliable monitoring with few false alarms. The calibration device enables a user to define a calibration element, either optically or numerically, which is located in the ship section, wherein an evaluation module determines the necessary extrinsic calibration parameters based on this selection. This provides a particularly simple-to-use calibration device, which enables a secure and accurate calibration of the monitoring device. In particular, the calibration device allows a plurality of cameras of a monitoring device to be calibrated quickly and cost-effectively.

The invention also relates to a method for man-overboard monitoring of a ship section. The method is carried out in particular with the monitoring device as described above. The method provides that the ship section is monitored using video technology and is provided as video data. A moving object is detected in the video data and a kinematic variable is determined for this object. The kinematic variable is, for example, an acceleration or velocity. Based on imaging parameters, extrinsic and/or intrinsic calibration parameters, a starting position is preferably determined in the three-dimensional space. Based on the starting position, the moving object can be classified as a man-overboard event or discarded.

BRIEF DESCRIPTION OF THE DRAWINGS

Further advantages, effects and embodiments are derived from the attached figures and their description. In the drawings.

DETAILED DESCRIPTION

Figure 1:
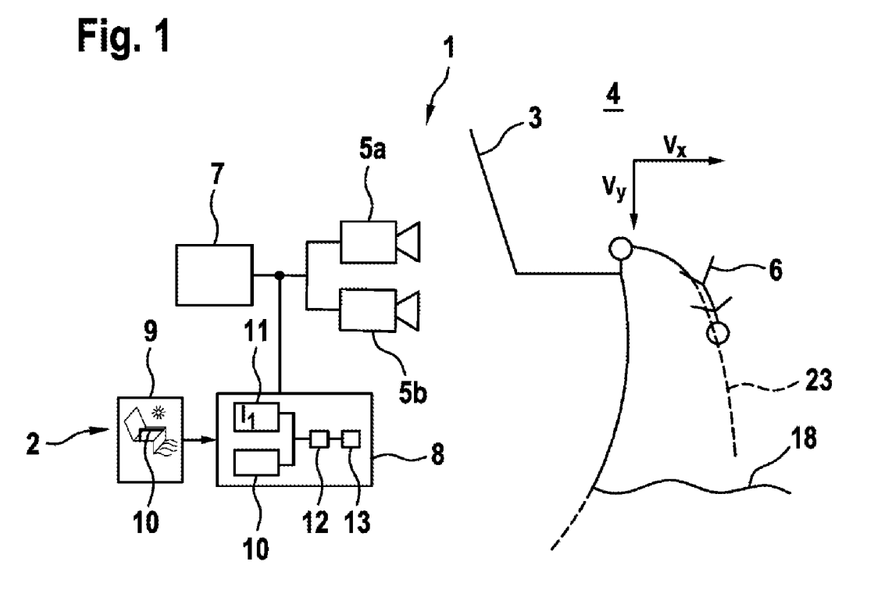
FIG. 1 shows a schematic view of a monitoring device with a calibration device.

FIG. 1 shows a monitoring device 1 with a calibration device 2. The monitoring device 1 is designed for monitoring a ship 3. The monitoring device 1 is used to monitor a ship section 4 of the ship 3 using video technology. The monitoring device 1 comprises two cameras 5a and 5b. The camera 5a is designed as a camera for recording images in the visual range, while the camera 5b forms an infrared camera and can also create and/or record images in darkness. The cameras 5a and 5b are directed at the ship section 4 and image this using video and/or image technology. The recordings are provided as video data to the calibration device 2. The monitoring device 1 is used to carry out man-overboard monitoring in the ship section 4. This monitors whether a person has gone overboard and is in danger. To do so, the monitoring device 1 determines a moving object in the ship section 4. For example, the moving object can be a person 6. The monitoring device 1 distinguishes between whether the moving object is a person 6 or another kind of object, such as trash or water. Only if the moving object has been characterized as a falling person 6 is an alarm output. Falling objects, such as cigarettes or similar items, are not classified as a man-overboard event, so that no alarm is issued.

A person 6 falling overboard will describe a parabolic trajectory. The person 6 and also objects are accelerated with the acceleration due to gravity towards the sea. In particular, any horizontal speeds caused by the fall are not accelerated and/or are constant. The trajectory 23 can be described by speeds $v_x$ and $v_y$. The velocity $v_y$ represents the accelerated movement towards the surface of the sea, while the velocity $v_x$ is a constant velocity perpendicular to it. The person 6 and/or the falling object has a length, which is understood, for example, as a diameter. For example, the diameter and/or the length can also be determined by a rectangle that circumscribes the falling object, wherein the diameter describes the diagonal of the rectangle.

The video data is provided to the evaluation device 7. The evaluation device 7 is part of the monitoring device 1 and is designed, for example, as a software module or as a computer unit. An evaluation device 7 can be connected in particular to a plurality of cameras 5a and 5b. Based on the video data, the evaluation device 7 determines whether the moving object is a person 6. In particular, the moving object is tracked by the evaluation device 7, for example in successive images of the video data. The evaluation device 7 is designed to determine a kinematic variable based on the video data for the moving object. The kinematic variable is, for example, a velocity profile and/or acceleration values of the moving object. Based on the kinetic variable, the evaluation device 7 is designed to determine a size and/or an extension or diameter of the moving object. For example, the evaluation device 7 uses the free-fall acceleration for this purpose. Since the free-fall acceleration or acceleration due to gravity is known as a numerical value, by comparing the pixels covered per second or pixels per second squared of the moving object, a size can be assigned to a pixel. By determining the pixels along the diagonal or the extension of the moving object, the size of the moving object can be determined. If the determined size of the moving object corresponds to an expected size of a human being or person 6, it is evaluated whether or not a man-overboard event has occurred.

In order to enable the determination of the kinematic variable and/or an extension of the moving object, the monitoring device 1 and in particular the cameras 5a and 5b must be calibrated. The calibration is performed by setting and/or determining the intrinsic and extrinsic calibration parameters 11, 12.

Extrinsic calibration parameters 12 are understood, in particular, as parameters which are due to the installation, alignment and/or distance of the camera 5a or 5b from the ship section 4, and/or dependent on the ship 3. For example, an extrinsic calibration parameter 12 is the viewing angle and/or the inclination angle of the camera 5a, 5b with respect to a horizontal and/or the water surface. Intrinsic calibration parameters 11 are understood to mean parameters of the camera 5a, 5b, which are dependent in particular on the imaging and/or imaging ratio of the cameras 5a, 5b. For example, intrinsic calibration parameters 11 are lens distortion, focal length, or aperture diameter. In particular, the intrinsic calibration parameters 11 can be adjusted and/or defined numerically. For example, they can be taken from a product data sheet of the camera 5a, 5b. The intrinsic calibration parameters 11 are, in particular, time invariant and/or constant. The extrinsic calibration parameters 12, on the other hand, can be time varying and must be defined and/or determined, in particular after the cameras have been installed. For this purpose, the monitoring device 1 comprises the calibration device 2.

The calibration device 2 comprises an evaluation module 8 and an input module 9. The input module 9 is connected to the evaluation module 8 by means of data communication technology. The evaluation module 8 is designed to allow a user to enter data graphically. For example, the input module 9 comprises a display for this purpose, such as a screen that displays a model of the ship 3, the ship section 4, or the video data. The user can select a calibration element 10 using the input module 9.

For example, the user can draw points and/or a line in the video data. The calibration element 10 is a geometric object which in particular has an orientation and a length. Furthermore, the user can assign dimensions such as the length to the calibration element 10 using the input module 9.

The video data is provided to the evaluation module 8. The intrinsic calibration parameters 11 are also provided to the evaluation module 8. For example, these may have been sent and/or transmitted from the camera 5a, 5b. Alternatively, the intrinsic calibration parameters 11 can be provided to the evaluation module 8 by a user input on the input module 9. The evaluation module 8 is designed to determine the extrinsic calibration parameters 12 based on the intrinsic calibration parameters 11, the calibration element 10 and the video data.

The calibration element 10 is a structural information item in the video data. For example, the calibration element 10 is formed as a vanishing line, as the horizon line, or a fixed line in the video data. Also, the calibration elements 10 may include known angles on the ship 3 and/or in the ship section 4. Known angles are, for example, those where one object is perpendicular to another. In particular, the evaluation module 8 can comprise a ship model 13. The ship model 13 is implemented as a 3D model, for example. For example, the calibration element 10 can also be selected in the displayed 3D model. The evaluation module 8 is then designed, based on the information from the calibration element 10, such as position, length and/or orientation and the comparison with how this calibration element 10 appears in the video data, to determine the extrinsic calibration parameters 12 such as the orientation and/or inclination of the view of the camera 5a, 5b onto the ship section 4. The determined extrinsic calibration parameters 12 are provided by data communication technology, in particular to the evaluation module 8.

Figure 2:
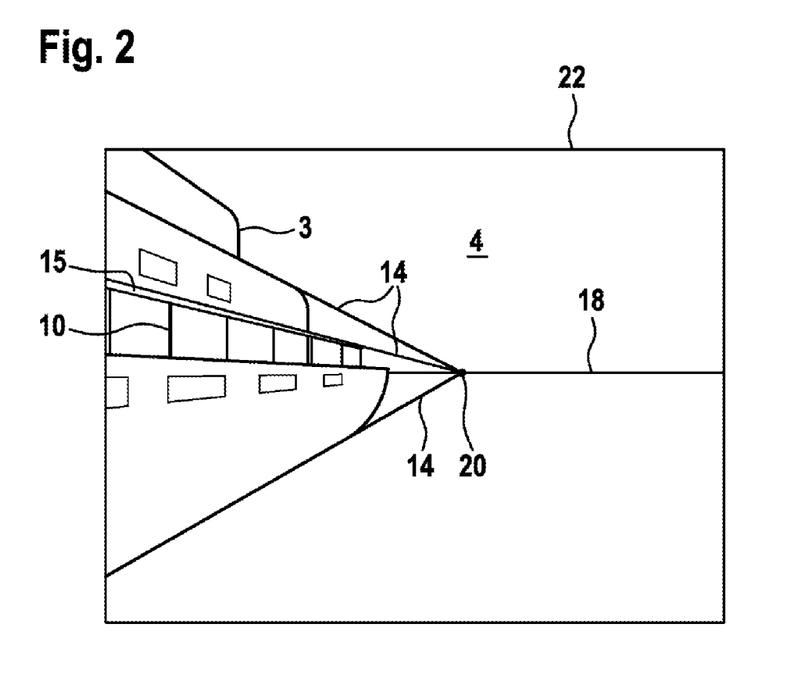
FIG. 2 shows a recorded image of the ship section with a calibration element.

FIG. 2 schematically shows an image and/or representation 22 of the ship section 4 in the video data. The ship section 4 and/or its image shows the ship 3 captured from the perspective of the camera 5a. Also shown is the horizon and/or the horizon line 18 which is bounded by the sea and/or the sea surface. Due to the perspective view of the camera 5a, the image contains vanishing lines 14. One of the vanishing lines 14 is defined, for example, by the ship 3 and/or the ship's wall, which runs toward the horizon and/or the horizon line 18. Another vanishing line 14 is formed by the railing 15, for example. The ship 3 floats on the sea, so that the height of the ship 3 is perpendicular to the sea. For example, the user has selected a strut of the railing 15 as the calibration element 10 in the model. This is positioned vertically on the deck, information which the user can enter and/or store, for example, using the input module 9. In particular, the calibration element 10 also has a length and/or an extension, wherein the length here is, for example, two meters. The user can also enter and/or provide the extension information using the input module 9. The evaluation module 8 is then designed to compare the video data with the 3D model, for example, and in particular to search for and/or analyze the calibration element 10 in the video data. For example, the evaluation module 8 searches for this calibration element 10 and assigns it a length and orientation in the video data and/or images. By knowing the length and orientation of the calibration element 10, the evaluation module 8 can now determine the extrinsic calibration parameters or calibration parameters and provide them to the evaluation module 8.

Figure 3:
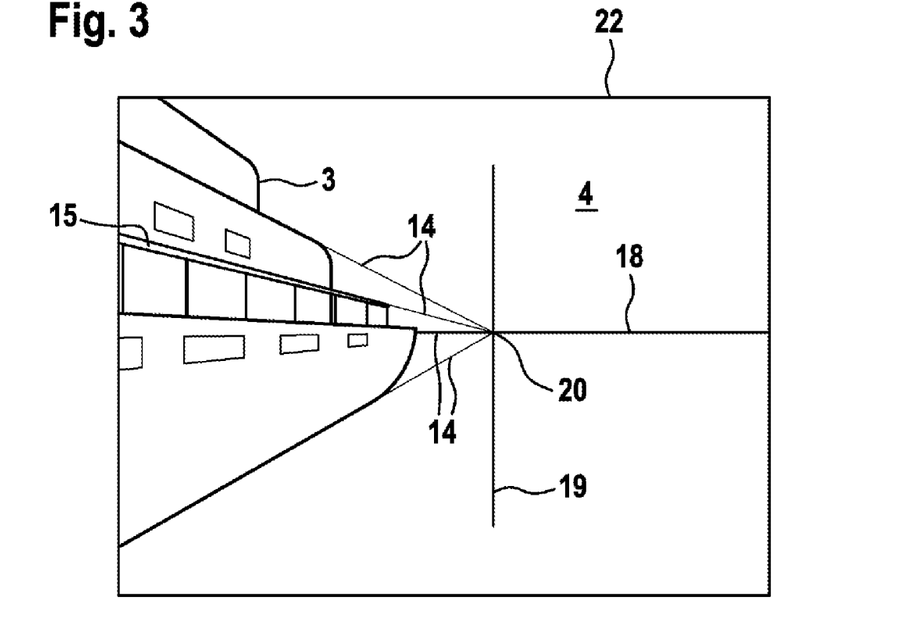
FIG. 3 shows a further recorded image with an alternative calibration element.

FIG. 3 shows another example of a picture 22 of the ship section 4 captured by the camera 5a. In the picture, an orientation of the camera 5a is specified and/or drawn in the form of a Cartesian coordinate system 19. This is specified and/or necessary, for example based on the lens distortion of the camera 5a. The picture again shows the ship 3, which again becomes narrower towards the horizon. For example, the vanishing lines 14 are defined by a railing and/or set by the user. The path of the railing as the vanishing line 14 and its position and/or angle enclosed with the Cartesian coordinate system 19 can be used to determine the orientation, position and/or rotation of the camera 5a when capturing the ship section 4. This rotation and/or orientation is provided to the evaluation module 8, for example, as extrinsic calibration parameters 12, after the analysis. The vanishing lines 14 intersect with the horizontal line 18 at the vanishing point 20.

Figure 4:
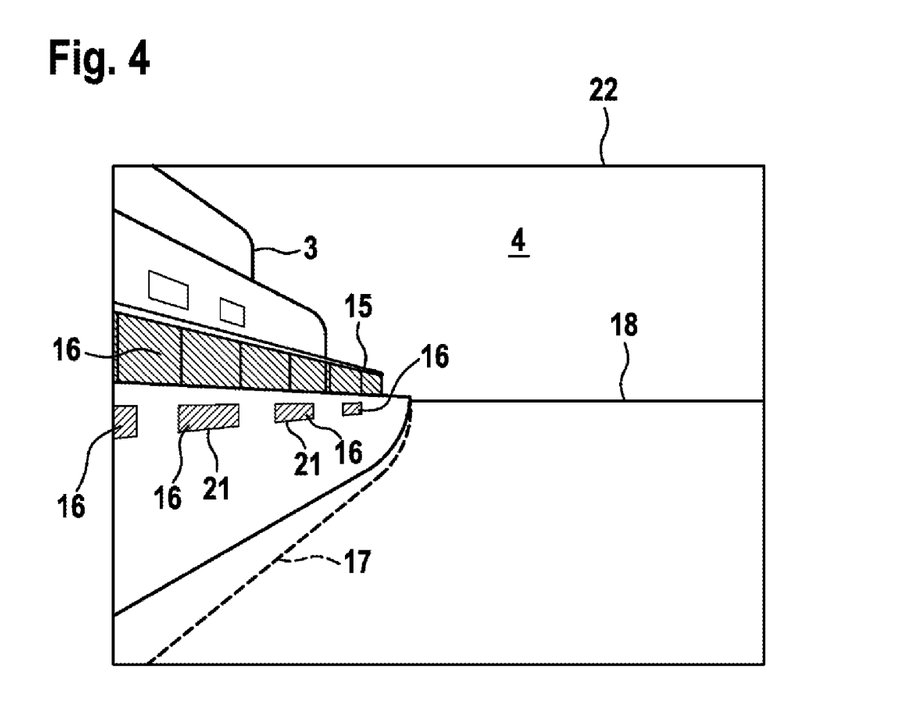
FIG. 4 shows a picture of the ship section with defined danger zones.

FIG. 4 shows an image 22 of the ship section 4 in the form of a picture taken with the camera 5a. For example, this image is drawn and/or displayed on the input module 9. In this image, the user can define areas for which the monitoring and/or evaluation of moving objects is provided if the starting point of the motion of the moving object is within this area. The areas selected in this way form danger zones 16. For example, the danger zones 16 can be selected and/or entered as a surface profile. For example, the user specifies the corner points and/or edge points, then forms a closed contour that is stored as the danger zone 16. For example, the danger zone 16 can also be located at window openings 21. Furthermore, the user can define and/or demarcate areas in the sea for which persons and/or persons who have fallen into the sea are to be expected. The sea boundary line 17 drawn in this way limits the evaluation of moving objects by the monitoring device 1. For example, the evaluation module 8 does not interpret a moving object that does not have a starting point in the danger zone 16 as a man-overboard event. Furthermore, objects that move in the sea outside the sea boundary line 17 are not interpreted as a man-overboard event. In this way, the evaluation module 8 can be used to ensure safe evaluation with minimum waste of data and resources. Furthermore, false alarms are also reduced by the fact that uninteresting and/or excluded areas are excluded from the evaluation.

The invention claimed is:

1. A monitoring device for monitoring man-overboard events in a ship section, the monitoring device comprising:
at least one camera, wherein the ship section is monitored using video technology by means of the at least one camera and the at least one camera is designed to provide the monitoring as video data; and
an evaluation device, the evaluation device having an interface for receiving the video data,
the evaluation device being designed to detect a moving object in the ship section based on the video data and to determine a kinematic variable of the moving object,
the evaluation device being designed to determine a starting point in three dimensions based on the video data and the kinematic variable of the moving object and to evaluate the moving object as a man-overboard event based on the starting point and a danger zone, wherein the danger zone is an area that includes at least one selected from the group consisting of a railing or a window opening.

2. The monitoring device as claimed in claim 1, wherein the at least one camera has intrinsic and extrinsic calibration parameters, and the evaluation device being designed to determine the starting position of the moving object based on the intrinsic and extrinsic calibration parameters.

3. The monitoring device as claimed in claim 1, wherein the evaluation device is designed to determine an extension of the moving object based on the kinematic variable and to evaluate the moving object as a man-overboard event on the basis of the extension.

4. The monitoring device as claimed in claim 1, wherein the evaluation device being designed to evaluate the moving object as a man-overboard event based on an appearance assigned to the moving object.

5. The monitoring device as claimed in claim 1, wherein the evaluation device is designed to determine an end point for the moving object and to evaluate the moving object as a man-overboard event based on the end point.

6. The monitoring device as claimed in claim 1, wherein the evaluation is designed to determine a free-fall acceleration as the kinematic variable and to compare the measured free-fall acceleration with a reference free-fall acceleration in order to determine the starting position and/or and extension.

7. The monitoring device as claimed in claim 1, wherein the evaluation device is designed to evaluate the moving object as a man-overboard event based on an impact zone.

8. The monitoring device as claimed in claim 1, wherein the evaluation device being designed to evaluate the moving object as a man-overboard event based on a 3D model of the ship section.

9. The monitoring device as claimed in claim 1, wherein the evaluation device is designed to determine a trajectory for the moving object, and the evaluation device being designed to evaluate the moving object as a man-overboard event based on the trajectory.

10. The monitoring device as claimed in claim 9, wherein the evaluation device is designed to project the trajectory into a 3D coordinate system.

11. The monitoring device as claimed in claim 1, wherein the video data comprise monocular images of the ship section.

12. The monitoring device as claimed in claim 1, wherein the at least one camera has two camera units, one camera unit being designed to record images in the visible range, and the other camera unit being designed to record images in the infrared range.

13. A method for man-overboard monitoring in a ship section with the monitoring device as claimed in claim 1, wherein a starting position in three-dimensional space is determined based on a kinematic variable of a moving object, the occurrence of a man-overboard event being deduced based on the starting position and a danger zone, wherein the danger zone is an area that includes at least one selected from the group consisting of a railing or a window opening.

14. A monitoring device for monitoring man-overboard events in a ship section, the monitoring device comprising:
at least one camera, wherein the ship section is monitored using video technology by means of the at least one camera and the at least one camera is designed to provide the monitoring as video data;
a calibration device, the calibration device is designed to determine remaining and/or unknown calibration parameters based on a calibration element, wherein the calibration element has an orientation and/or an extension; and
an evaluation device, the evaluation device having an interface for receiving the video data,
the evaluation device being designed to detect a moving object in the ship section based on the video data and to determine a kinematic variable of the moving object, and
the evaluation device being designed to determine a starting point in three dimensions based on the video data and the kinematic variable of the moving object and to evaluate the moving object as a man-overboard event based on the starting point.

15. A monitoring device for monitoring man-overboard events in a ship section, the monitoring device comprising:
at least one camera, wherein the ship section is monitored using video technology by means of the at least one camera and the at least one camera is designed to provide the monitoring as video data;

a calibration device, the calibration device is designed to determine remaining and/or unknown calibration parameters based on a calibration element, wherein the calibration element has an orientation and/or an extension; and an evaluation device, the evaluation device having an interface for receiving the video data, the evaluation device being designed to detect a moving object in the ship section based on the video data and to determine a kinematic variable of the moving object, and the evaluation device is designed as an artificial intelligence system for learning with regard to an appearance, extension, end point and/or starting position.

* * * * *